No. 805,408. PATENTED NOV. 21, 1905.
T. BROADBENT & I. HEY.
TROLLEY WHEEL.
APPLICATION FILED JUNE 17, 1904.
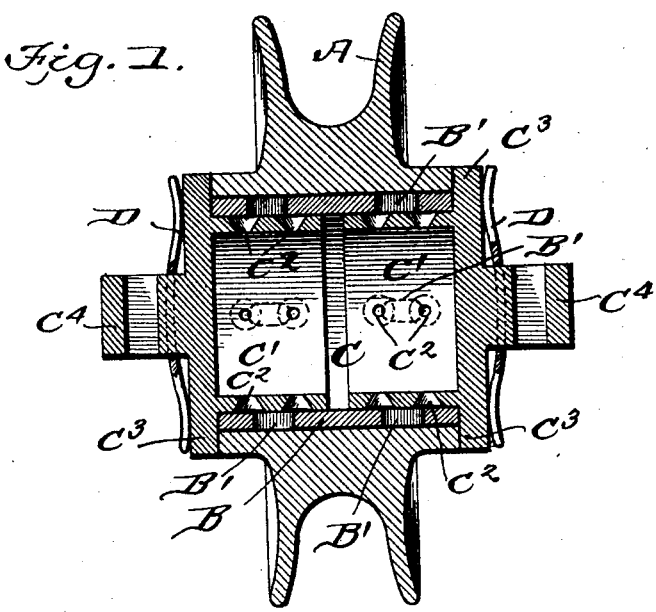
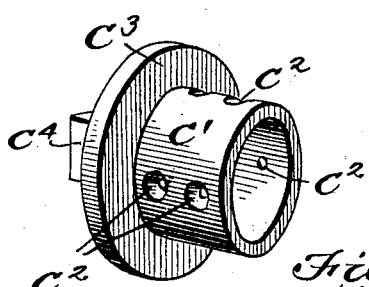
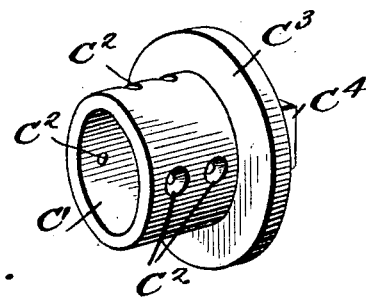
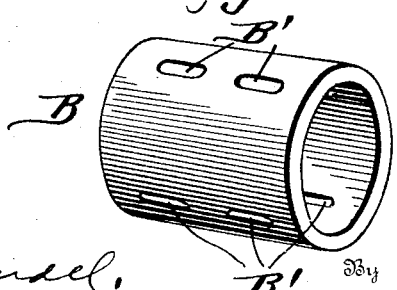
Witnesses
Inventors
I. Hey.
T. Broadbent.
By
Attorney

UNITED STATES PATENT OFFICE.

THOMAS BROADBENT AND ISRAEL HEY, OF WOLLASTON, MASSACHUSETTS.

TROLLEY-WHEEL.

No. 805,408.     Specification of Letters Patent.     Patented Nov. 21, 1905.

Application filed June 17, 1904. Serial No. 212,961.

*To all whom it may concern:*

Be it known that we, THOMAS BROADBENT and ISRAEL HEY, citizens of the United States, residing at Wollaston, in the county of Norfolk and State of Massachusetts, have invented a new and useful Improvement in Trolley-Wheels, of which the following is a specification.

This invention relates generally to trolley-wheels, and more particularly to the bearing for the same, the object being to provide an exceedingly simple and highly-efficient form of bearing in which graphite can be used as a lubricant.

Another object of the invention is to provide a hollow journal or axle, thereby preventing overheating of the same.

With these objects in view our invention consists, essentially, in the employment of a transversely-divided hollow axle having a plurality of openings, the lubricant being adapted to be contained within the axle, said axle having flanged ends provided with laterally-projecting lugs, a cylinder-bushing adapted to envelop the sectional axle and rest between the flanged ends, said bushing having elongated openings, and the trolley-wheel arranged upon the bushing and between the flanged ends of the axle, the laterally-projecting lugs having spring plates or bushes arranged thereon to increase the contact.

The invention consists also in certain details of construction and novelties of combination, all of which will be fully described hereinafter and pointed out in the claims.

In the drawings forming a part of this specification, Figure 1 is a vertical sectional view of a trolley-wheel constructed in accordance with our invention. Figs. 2 and 3 are detail perspective views of the sections of the axle, and Fig. 4 is a detail perspective view of the bushing.

Referring to the drawings, A indicates the ordinary construction of trolley-wheel, which turns freely upon the bushing B of any suitable metal, said bushing being cylindrical in shape and provided with elongated openings $B'$. The bushing B surrounds and envelops the sections $C'$ of the hollow axle C, which is divided transversely, and each section is provided with a series of openings $C^2$, through which lubricant can escape to the bushing and wheel. In practice we prefer to employ graphite as a lubricant, as it adds to the conductivity of the trolley. Each section $C'$ has a flanged end $C^3$, from which extends a lateral projecting lug $C^4$, to which the trolley-harp is connected, and each projection has a spring plate or brush D arranged thereon, which serves to make a positive contact at all times. The bushing and the trolley-wheel are both arranged between the flanged ends of the hollow sectional axle, as most clearly shown in Fig. 1.

A trolley constructed as herein shown and described will turn very freely, inasmuch as the wheel is loose upon the bush and the bush is loose upon the axle and both properly lubricated, and by having the axle hollow and using graphite as a lubricant the wheel, bushing, and axle are kept cool and the conductivity of the parts correspondingly increased.

Having thus fully described our invention, what we claim as new, and desire to secure by Letters Patent, is—

1. A device of the kind described comprising a hollow transversely-divided axle having lubricating-openings, a cylindrical bushing provided with openings and surrounding the axle, and a trolley-wheel mounted on the bushing.

2. A hollow transversely-divided axle provided with openings and having flanged ends, a bushing provided also with openings and the trolley arranged upon the bushing between the flanges.

3. A trolley, the bushing upon which it is mounted, said bushing having openings and a transversely-divided hollow axle provided with openings and having flanged ends, said ends also having laterally-projecting lugs.

4. A trolley, the bushing upon which it is mounted, said bushing having openings, and a transversely-divided hollow axle provided with openings and having flanged ends, said ends also having laterally-projecting lugs, and the spring-plates arranged upon said lugs.

THOMAS BROADBENT.
ISRAEL HEY.

Witnesses to signature of Thomas Broadbent:
   WELCON C. DAVIS,
   WM. C. MOAK.

Witnesses to signature of Israel Hey:
   WALTER I. HEY,
   HAMILTON C. CHASE.